No. 828,520. PATENTED AUG. 14, 1906.
T. SHAFFER.
CHOCOLATE DIPPING MACHINE.
APPLICATION FILED DEC. 18, 1905.

WITNESSES. INVENTOR.
William M. Myers Thomas Shaffer.
George W. Hinton

UNITED STATES PATENT OFFICE.

THOMAS SHAFFER, OF ST. JOSEPH, MISSOURI.

CHOCOLATE-DIPPING MACHINE.

No. 828,520.  Specification of Letters Patent.  Patented Aug. 14, 1906.

Application filed December 18, 1905. Serial No. 292,281.

*To all whom it may concern:*

Be it known that I, THOMAS SHAFFER, a citizen of the United States, residing at St. Joseph, in the county of Buchanan and State of Missouri, have invented certain new and useful Improvements in Chocolate-Dipping Machines, of which the following is a specification.

My invention relates to improvements in chocolate-dipping machines; and the objects of my improvements are, first, to provide a chocolate-dipping machine which shall be cheap in cost of manufacture, which can be attached to a work bench or table, and in which every facility shall be provided for applying a coating of any desired weight or thickness of melted chocolate upon either hard or fine soft centers of chocolate drops, and to so construct and arrange the parts of a chocolate-dipping machine that it shall be operated manually without the use of other power and be operated with the utmost ease and rapidity; second, to provide a chocolate-dipping machine in which the heat shall be applied in such a manner as will in no way injure the chocolate being used and in which the heating device can be easily and quickly adjusted to and will maintain the required degree of heat for continued operation; third, to so construct said machine that splashing and consequent chilling of chocolate will be avoided; fourth, to provide a chocolate-dipping machine which shall be simple durable and be adapted to use in a variety of places—such as either in large or small factories, candy-kitchens, &c.—and which shall occupy the minimum amount of space. I attain these objects by the mechanism illustrated in the accompanying drawings, in which—

Figure 1:
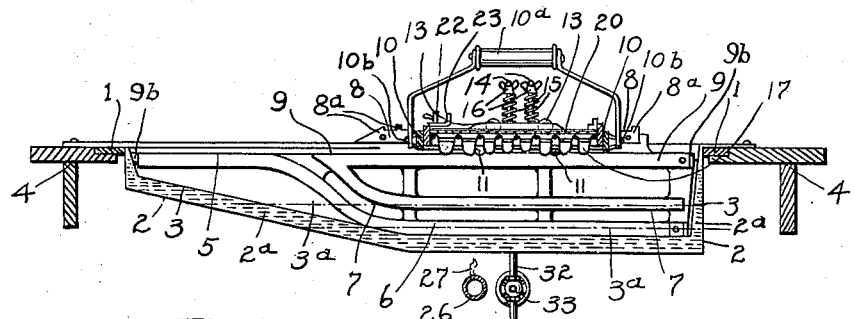
Figure 2:
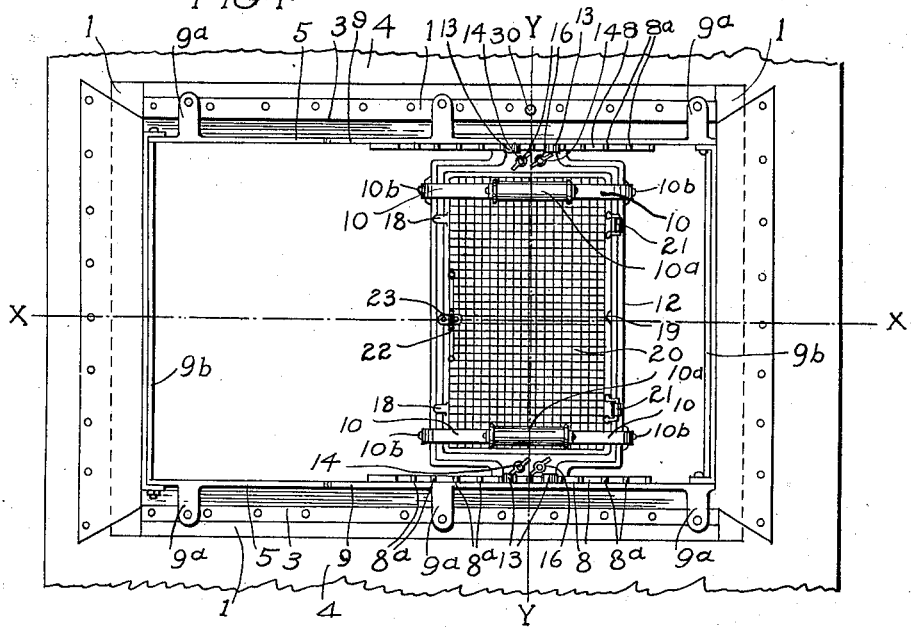
Figures 3, 4:
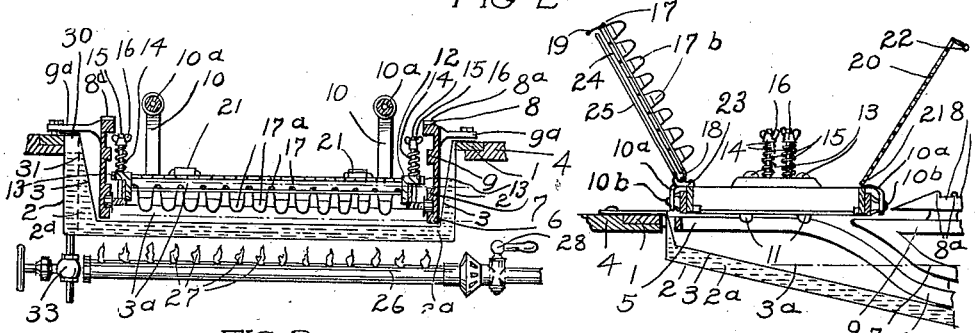

Figure 1 is a longitudinal section cut vertically on the line X X seen in Fig. 2, showing parts in agitating position. Fig. 2 is a top plan. Fig. 3 is a transverse section cut vertically on the line Y Y seen in Fig. 2, showing parts in dipping position. Fig. 4 is a transverse section of certain parts in transferring position, cut on line Y Y seen in Fig. 2.

My invention consists of a rectangular frame 1, an outer sheet-metal water-vat 2, for holding water $2^a$, and an inner sheet-metal dipping-vat 3, for holding chocolate $3^a$, said vats being secured in frame 1, the whole adapted to be mounted in any ordinary work bench or table 4, also two opposed sets of rails in vat 3, secured in place by brackets $9^a$, and in which each set consists of rail 5, dipping-rail 6, retaining-rail 7, agitating-rail 8, (having agitating projections $8^a$ thereon,) and retaining-rail 9. Said sets of rails are secured together by bars $9^b$, (seen in Figs. 1 and 3,) the carriage 10, its two pivotally-attached handles $10^a$, its transporting-wheels 11, agitatable basket-holder 12, its agitating-wheels 13, guide-rods 14, having their lower portions secured in carriage 10 and extending upward through apertures in holder 12, springs 15, guided and retained in place by rods 14 and pressing upon holder 12, tension-adjusting thumb-nuts 16, basket 17, for holding chocolate-drop centers $17^a$ and having half-hinges 18, and handle 19, also backing-screen 20, hinges 21, (by which screen 20 is hinged to basket-holder 12,) and handle 22 on screen 20 and a fastener 23 on basket-holder 12, for detachably fastening the free edge of backing-screen 20 to holder 12, together with a suitable sheet of waxed paper 24 and a sheet-metal tray 25, for receiving and handling the chocolate drops $17^b$. (Seen in Fig. 4.) Beneath water-vat 2 is a burner 26, preferably for gas; but the same may be made suitable for gasolene or any suitable fuel for feeding flames 27, the heat from which is regulated by cock 28. Water-vat 2 is provided with a filling-tube 29, which is provided with a filling-opening 30 at its upper end, openings 31, for communicatively connecting tube 29 and vat 2, and with a drain-tube 32, provided with a globe-valve 33 (seen in Fig. 3) for draining water from vat 2 when desired.

In the operation of my invention vat 2 is filled with water $2^a$ through opening 30. Vat 3 is filled to the point shown in Figs. 1 and 3 with chocolate $3^a$. Fuel is turned on through cock 28 and ignited at flames 27 after chocolate $3^a$ is melted by heat of water $2^a$, heated by flames 27. Said flames are regulated by cock 28 to the desired degree of heat for continuous operation, and the machine is then ready for use as follows:

Referring to Fig. 4, the carriage 10, having wheels 11, is placed on rails 5, with the parts in position, as seen, and a series or group of suitably-formed baskets 17, in which have previously been placed the centers $17^a$, (seen in Fig. 3,) is placed in basket-holder 12, after which screens 20 (seen in Fig. 4) is rotated on hinges 21 to the position seen in Figs. 1, 2, and 3, and its free edge is detachably secured to basket-holder 12 by fastener 23, after which the operator (not shown) grasps handles $10^a$ and rotates said handles on the pivotal attachment 10$^b$ (by which said handles are attached to carriage 10) to the position seen in Figs. 1, 2, and 3, and by said handles manually pushes carriage 10 and its attached parts on the transporting-wheels 11 forward, downward, and along and on dipping-rails 6 to the dipping position seen in Fig. 3, thus submerging centers 17$^a$ in the melted liquid chocolate 3$^a$, after which carriage 10 and its attached parts are drawn backward and upward along rails 6 onto rails 5 and instantly pushed forward and manually guided onto rails 9, and as carriage 10 on transporting-wheels 11 is manually pushed along and on rails 9, the agitating-wheels 13, by projections 8$^a$ on rails 8, are forced to rise and carry upward the basket-holder 12, and thus to overcome the elastic pressure of springs 15, and as said wheels 13 are manually pushed farther past projections 8$^a$, respectively, the elastic pressures of springs 15 force downward the basket-holder 12 and wheels 13, carried thereby. Thus by a rapid reciprocating movement of carriage 10 along rails 9 the basket-holder 12 is agitated for removal of excessive amount of chocolate from centers 17$^b$, carried in basket 17. By thumb-nuts 16 on guide-rods 14 the tensions of springs 15 are adjustably increased for more and decreased for less violent agitation of basket-holder 12. At the time and while agitating-wheels 13 are caused to rise, as described, the carriage 10 is prevented from rising by the lower surfaces of rails 8, which are above and act against the upper surfaces of transporting-wheels 11, and the centers 17$^a$ are retained in baskets 17 by backing-screen 20.

After the before-described operations of dipping and agitating have been performed carriage 10 is drawn to the position seen in Fig. 4 with its transporting-wheels resting on rails 5. The fastener 23 is rotated from position seen in Fig. 2 to position seen in Fig. 4, and the thus freed edge of screen 20 is raised by handle 22 until screen 20 rotates upon its hinges 21 from the position seen in Figs. 1, 2, and 3 to the position seen in Fig. 4, laying bare the backs of chocolate drops 17$^b$, upon which is laid the sheet of waxed paper 24, and upon this the sheet-metal tray 25 is placed, after which the entire series or set of baskets 17 is by handle 19 rotated on its loose half-hinges 18, carrying tray 25, paper 24, and chocolate drops 17$^a$ to the position shown in Fig. 4, thus inverting the baskets 18 and depositing chocolate drops 17$^b$ on the tray-supported sheet of waxed paper ready to be carried by tray 25 where desired, after which the before-described operations of placing, dipping, agitating, and removing, as described, are continually repeated.

While I have shown and described my invention in the foregoing manner, it is evident that I wish to reserve the right to use any other fuel or source of heat—such as gasolene, steam heat, &c.—instead of gas in burner 26 and would consider such as being an equivalent thereto and to so variously shape, proportion, and arrange the various parts of my invention as the variations in situations and services may require without departing from the spirit of my invention.

I am aware that chocolate-dipping machines have been invented which are expensive in cost of manufacture, are complex in mechanism, are necessarily driven by power and occupy comparatively a large amount of space and in which the chocolate-drop centers are placed and the chocolate-drops are removed by a multiplicity of complex and tedious operations and in which the centers are carried vertically downward into and vertically upward out of liquid chocolate to a considerable height and agitated by a non-adjustable power-driven agitator which chills the liquid chocolate in the vat and precludes the possibility of graduating the weight and thickness of the chocolate coating on said centers; but I am not aware that any chocolate-dipping machines have been invented prior to this my invention in which the centers for chocolate drops are placed and chocolate drops are removed by but few simple and easy operations and in which said centers are carried on an easy incline into and out of liquid chocolate and are agitated while at an inconsiderable height above the liquid chocolate by a simple, manually operated, and adjustable mechanism, which is cheap in cost of manufacture, durable, and occupies the minimum amount of space.

Therefore what I claim as new and original, and desire to secure by Letters Patent, is—

1. In a chocolate-dipping machine, a dipping-vat adapted to hold melted chocolate, transferring and dipping rails within said dipping-vat, a carriage for carrying chocolate-drop centers, handles for pushing said carriage, and transporting-wheels for said carriage, adapted to travel upon said rails.

2. In a chocolate-dipping machine, a rectangular frame, an outer vat, secured in said frame, a dipping-vat, adapted to hold melted chocolate, and secured within said outer vat, and of such size as leaves a suitable space between said vats for reception of water, a filling-tube for said space, a carriage for receiving, carrying, retaining, agitating and removing chocolate-drop centers and chocolate drops, handles for manually operating said carriage, transporting-wheels, for said carriage, and transferring and dipping rails, within said dipping-vat, and upon which said transporting-wheels are adapted to travel.

3. In a chocolate-dipping machine, a suitably-supported frame, an outer vat, secured in said frame, a dipping-vat, adapted to hold melted chocolate, and secured within said outer vat, and of such size as leaves a suitable space for reception of water, means for filling with, and draining said space of water, a fuel-burner, beneath said outer vat, and means for adjusting heat, from said burner, transferring and dipping rails, within said dipping-vat, a carriage having wheels adapted to travel on said rails, and means for operating said carriage, and its attached parts.

4. The combination with a water-jacketed vat, adapted to hold melted chocolate, of heating means as described, transferring and dipping rails within said vat, a carriage for receiving, carrying, retaining, agitating and removing chocolate - drop centers, handles for manually driving said carriage and transporting-wheels for said carriage, adapted to travel on said rails.

5. In a chocolate-dipping machine, an outer vat, an inner vat within said outer vat, and of such size as leaves a space, adapted to receive, retain and drain water between said vats, two sets of rails situated opposite to each other in said inner vat, in which each of said sets of rails consists of one transferring-rail, one dipping-rail, two retaining-rails and one attached agitating-rail, a set or series of baskets, adapted to carry chocolate-drop centers, a backing-screen for said series of baskets, an agitatable holder for holding said series of baskets, agitating-wheels for agitating said holder adapted to travel upon said agitating-rails, a carriage for carrying said holder, transporting-wheels for said carriage, adapted to travel upon said transferring and dipping rails and handles for manually driving said carriage.

6. In a chocolate-dipping machine, a dipping-vat adapted to hold melted chocolate, suitable means for heating said vat, transferring, dipping and retaining rails within said vat, a carriage carrying an agitatable basket-holder, handles upon said carriage, a set or series of baskets removably secured in said holder and carried by said carriage, transporting-wheels for said carriage, adapted to travel on said rails, agitating-wheels for said agitatable basket-holder, agitating-rails having projections thereon and situated above said vat, guide-rods, springs encircling said rods and thumb-nuts upon said rods for adjusting the tension of said springs, the whole adapted to operate as and for the purposes specified.

7. The combination with a water-jacketed vat and means for heating said vat, of dipping, retaining and transferring rails within said vat, a carriage having transporting-wheels adapted to travel on said rails agitating-rails above said vat, an agitatable basket-holder having agitating-wheels, agitating-rails having projections thereon over which said agitating-wheels are adapted to travel and be agitated thereby, a set or series of baskets secured and removable in said holder, a backing - screen, having one of its edges hinged to said holder and its free edge attached to and which may be detached from said holder by a suitable fastener, the whole adapted to be operated in conjunction with a sheet of waxed paper and a sheet-metal tray as specified.

In testimony whereof I affix my signature in presence of two witnesses.

THOMAS SHAFFER.

Witnesses:
GEORGE W. HINTON,
WILLIAM M. MYERS.